US009651106B2

(12) United States Patent
Suzuki et al.

(10) Patent No.: US 9,651,106 B2
(45) Date of Patent: May 16, 2017

(54) CALIPER BRAKE APPARATUS

(71) Applicant: KAYABA INDUSTRY CO., LTD., Tokyo (JP)

(72) Inventors: Tsutomu Suzuki, Kanagawa (JP); Yoshiyuki Ookawara, Kanagawa (JP)

(73) Assignee: KYB Corporation, Tokyo (JP)

( * ) Notice: Subject to any disclaimer, the term of this patent is extended or adjusted under 35 U.S.C. 154(b) by 50 days.

(21) Appl. No.: 14/388,607

(22) PCT Filed: Aug. 1, 2013

(86) PCT No.: PCT/JP2013/070917
§ 371 (c)(1),
(2) Date: Sep. 26, 2014

(87) PCT Pub. No.: WO2014/024775
PCT Pub. Date: Feb. 13, 2014

(65) Prior Publication Data
US 2015/0053510 A1 Feb. 26, 2015

(30) Foreign Application Priority Data

Aug. 6, 2012 (JP) ................. 2012-173814

(51) Int. Cl.
*F16D 65/097* (2006.01)
*F16D 65/84* (2006.01)
(Continued)

(52) U.S. Cl.
CPC ............... *F16D 65/84* (2013.01); *B61H 5/00* (2013.01); *F16D 55/2245* (2013.01);
(Continued)

(58) Field of Classification Search
CPC ............ F16D 65/0093; F16D 65/0097; F16D 65/0068; F16D 65/0979; F16D 2055/0016;
(Continued)

(56) References Cited

U.S. PATENT DOCUMENTS 3,274,904 A 9/1966 Jacoby
3,486,589 A * 12/1969 Hillegass ............ F16D 65/0979
188/244
(Continued)

FOREIGN PATENT DOCUMENTS

EP 0693634 A1 1/1996
JP 62-049028 A 3/1987
(Continued)

*Primary Examiner* — Bradley King
*Assistant Examiner* — James Hsiao
(74) *Attorney, Agent, or Firm* — Rabin & Berdo, P.C.

(57) ABSTRACT

A caliper brake apparatus includes: a guide plate that supports a brake shoe; an anchor pin that supports the guide plate and is provided in a caliper main body to be free to advance and retreat; a piston provided in the caliper main body to be free to advance and retreat; a piston plate that is fixed to the piston and supported by the anchor pin; an elastic membrane that is provided so as to define a pressure chamber in the caliper main body, and that moves the brake shoe via the piston, the piston plate, and the guide plate; and an intermediate member disposed between the piston plate and the guide plate. The intermediate member is interposed between the piston plate and the guide plate such that a gap is formed between the piston plate and the guide plate.

12 Claims, 4 Drawing Sheets

(51) Int. Cl.
*B61H 5/00* (2006.01)
*F16D 65/18* (2006.01)
*F16D 55/224* (2006.01)
*F16D 65/54* (2006.01)
*F16D 55/2265* (2006.01)
*F16D 65/00* (2006.01)
*F16D 55/00* (2006.01)
*F16D 121/02* (2012.01)
*F16D 125/12* (2012.01)
*F16D 121/08* (2012.01)

(52) U.S. Cl.
CPC ..... *F16D 55/2265* (2013.01); *F16D 65/0068* (2013.01); *F16D 65/18* (2013.01); *F16D 65/54* (2013.01); *F16D 2055/0091* (2013.01); *F16D 2121/02* (2013.01); *F16D 2121/08* (2013.01); *F16D 2125/12* (2013.01)

(58) Field of Classification Search
CPC .. F16D 65/0087; F16D 65/84; F16D 65/0971; F16D 65/0972
See application file for complete search history.

(56) References Cited

U.S. PATENT DOCUMENTS

| | | | | |
|---|---|---|---|---|
| 3,497,036 A * | 2/1970 | Seip | ........................ | F16D 55/22 188/196 P |
| 3,497,038 A * | 2/1970 | Anders | .................... | F16D 65/84 188/322.18 |
| 3,506,098 A * | 4/1970 | Anders | ................. | F16D 55/228 188/205 R |
| 3,570,631 A * | 3/1971 | Schaftner | ................ | F16D 65/54 188/196 P |
| 3,765,513 A * | 10/1973 | Brooks | .................. | F16D 65/567 188/106 F |
| 3,768,603 A * | 10/1973 | Hoffman | ............... | F16D 55/224 188/72.3 |
| 3,918,555 A * | 11/1975 | Rath | ................... | F16D 65/0006 188/205 A |
| 3,995,723 A | 12/1976 | Holcomb, Jr. | | |
| 4,055,237 A * | 10/1977 | Numazawa | ........... | F16D 55/226 188/73.35 |
| 4,186,824 A * | 2/1980 | Preston | ............... | F16D 65/0979 188/73.38 |
| 4,284,176 A * | 8/1981 | Haraikawa | ........... | F16D 65/567 188/196 M |
| 4,327,925 A * | 5/1982 | Alexander | .............. | B23P 15/00 188/73.31 |
| 4,375,842 A * | 3/1983 | Melinat | ............. | F16D 55/22655 188/196 P |
| 4,433,757 A * | 2/1984 | Warwick | ............... | F16D 55/227 188/1.11 R |
| 4,494,630 A * | 1/1985 | Stoka | .................... | F16D 55/228 188/196 R |
| 4,513,844 A * | 4/1985 | Hoffman, Jr. | ....... | F16D 65/0006 188/264 G |
| 4,537,289 A * | 8/1985 | VonGrunberg | ..... | F16D 65/0979 188/264 G |
| 4,572,336 A * | 2/1986 | Smith | .................... | F16D 65/84 188/106 F |
| 4,596,317 A * | 6/1986 | Nagai | ................. | F16D 65/0971 188/250 G |
| 4,603,760 A * | 8/1986 | Myers | ................... | F16D 65/0006 188/250 R |
| 4,606,438 A * | 8/1986 | Mathias | ................. | F16D 65/092 188/250 B |
| 4,662,483 A * | 5/1987 | Boeck | ................... | F16D 55/226 188/72.3 |
| 4,852,699 A * | 8/1989 | Karnopp | ............... | B60T 13/741 188/162 |
| 4,958,703 A * | 9/1990 | Op Den Camp | ..... | F16D 55/227 188/205 R |
| 5,009,291 A * | 4/1991 | Castellano | ............ | F16D 65/847 188/264 CC |
| 5,031,511 A * | 7/1991 | Villata | .................... | F16D 65/84 188/71.6 |
| 5,219,048 A * | 6/1993 | Shaw | ..................... | B60T 13/741 188/106 P |
| 5,343,985 A * | 9/1994 | Thiel | ..................... | F16D 55/227 188/72.5 |
| 5,358,078 A * | 10/1994 | Gajek | ....................... | B62L 1/00 188/26 |
| 5,485,899 A * | 1/1996 | Thiel | ..................... | F16D 55/227 188/234 |
| 5,529,150 A * | 6/1996 | Buckley | ............ | F16D 55/22655 188/196 D |
| 5,704,452 A * | 1/1998 | Maligne | ............. | F16D 65/0979 188/73.38 |
| 5,931,268 A * | 8/1999 | Kingston | ............ | F16D 65/0006 188/158 |
| 6,119,818 A * | 9/2000 | Krumbeck | ................ | B62L 1/00 188/24.12 |
| 6,651,784 B1 * | 11/2003 | Barbosa | ................ | F16D 65/18 188/71.9 |
| 7,367,433 B2 * | 5/2008 | Bieker | ................ | F16D 65/0979 188/71.7 |
| 8,590,675 B2 * | 11/2013 | Jungmann | ............... | F16D 65/18 188/71.9 |
| 2008/0264737 A1 * | 10/2008 | Baumgartner | ...... | F16D 65/0971 188/72.4 |
| 2010/0025166 A1 * | 2/2010 | Suzuki | ............ | F16D 55/2245 188/73.31 |
| 2010/0044167 A1 * | 2/2010 | Suzuki | ..................... | B61H 5/00 188/72.3 |
| 2011/0233009 A1 * | 9/2011 | Suzuki | .................... | F16D 65/18 188/72.4 |
| 2012/0181123 A1 * | 7/2012 | Ruiz | ........................ | F16J 1/00 188/72.4 |
| 2013/0001025 A1 * | 1/2013 | Tanabe | .................... | F16D 65/02 188/72.4 |
| 2013/0068574 A1 * | 3/2013 | Arbesman | .......... | F16D 65/0971 188/73.37 |
| 2014/0041970 A1 * | 2/2014 | Burgoon | ............... | F16D 65/847 188/72.4 |

FOREIGN PATENT DOCUMENTS

| | | |
|---|---|---|
| JP | 2009-115214 A | 5/2009 |
| JP | 2010-007689 A | 1/2010 |
| JP | 2011-047429 A | 3/2011 |
| JP | 2011-047430 A | 3/2011 |
| JP | 2011-236958 A | 11/2011 |
| JP | 2013-160299 A | 8/2013 |
| JP | 2013-160300 A | 8/2013 |

* cited by examiner

CALIPER BRAKE APPARATUS

TECHNICAL FIELD

The present invention relates to a caliper brake apparatus that applies a brake to rotation of a vehicle wheel by applying frictional force to a brake disk that rotates together with the vehicle wheel.

BACKGROUND ART

A brake apparatus employed conventionally in a railway vehicle or the like applies a brake to rotation of a vehicle wheel using fluid pressure such as oil pressure or air pressure.

JP2011-236958A discloses a caliper brake apparatus in which a piston is moved by expanding a diaphragm through an increase in air pressure, and a brake shoe is caused to slide against a brake disc of a vehicle wheel by the movement of the piston.

SUMMARY OF INVENTION

In the caliper brake apparatus described above, the brake shoe is supported by a guide plate, and the guide plate is fixed to the piston. Frictional heat generated when the brake shoe slides against the brake disc is transmitted to the diaphragm, which is disposed on a back surface of the piston, via the guide plate and the piston. A problem therefore exists in that heat deterioration is likely to occur in the diaphragm, which is constituted by an elastic membrane.

An object of the present invention is to provide a caliper brake apparatus in which transmission of frictional heat generated when a brake shoe slides against a disc to an elastic membrane can be suppressed.

According to an aspect of the present invention, a caliper brake apparatus that applies a brake to a vehicle wheel by applying frictional force to a disc that rotates together with the vehicle wheel is provided. The caliper brake apparatus includes: a caliper main body supported by a vehicle body; a brake shoe capable of applying frictional force to the disc by sliding against the disc; a guide plate that supports the brake shoe; an anchor pin that supports the guide plate and is provided in the caliper main body to be free to advance and retreat; a piston provided in the caliper main body to be free to advance and retreat; a piston plate that is fixed to a front surface of the piston and supported by the anchor pin; an elastic membrane that is provided on a back surface of the piston so as to define a pressure chamber in the caliper main body, and that is deformed elastically by working fluid pressure in the pressure chamber so as to move the brake shoe via the piston, the piston plate, and the guide plate; and an intermediate member disposed between the piston plate and the guide plate. The intermediate member is interposed between the piston plate and the guide plate such that a gap is formed between the piston plate and the guide plate.

DESCRIPTION OF EMBODIMENTS

Figure 1:
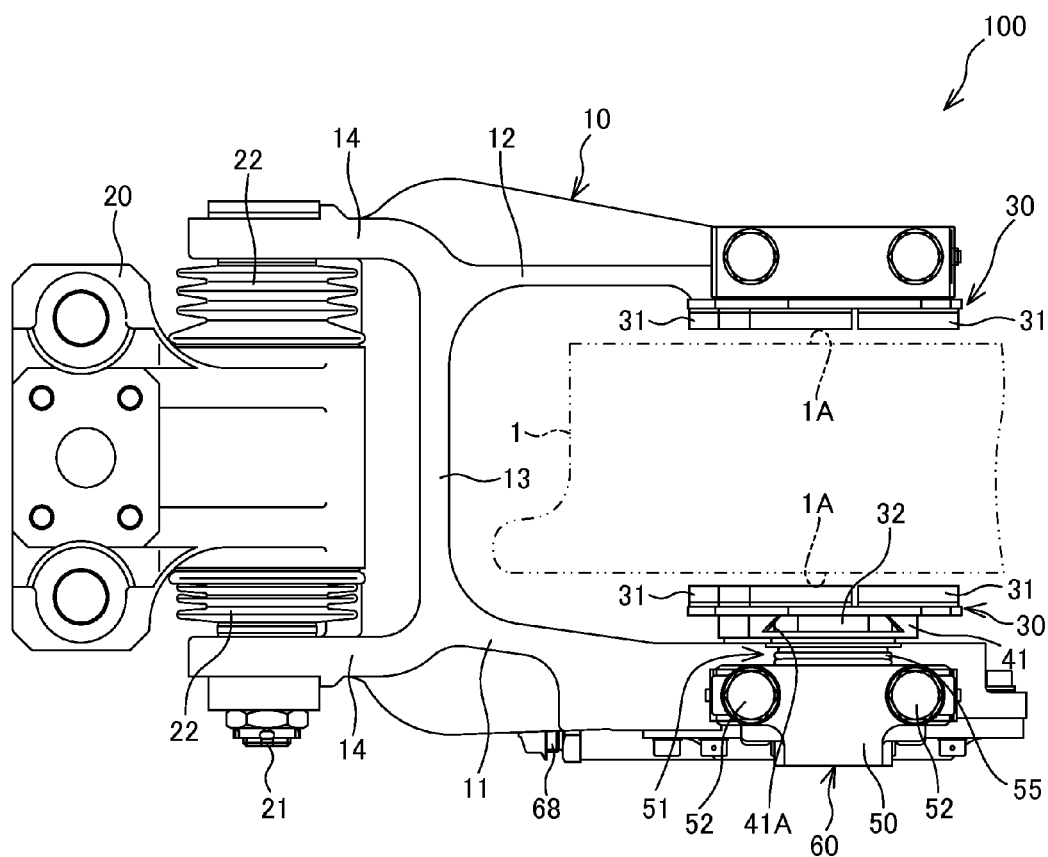
FIG. 1 is a plan view of a caliper brake apparatus according to an embodiment of the present invention.

An embodiment of the present invention will be described below with reference to the figures.

First, referring to FIGS. 1 and 2, an overall configuration of a caliper brake apparatus 100 according to this embodiment will be described.

The caliper brake apparatus 100 is a brake apparatus for a railway vehicle that uses air as a working fluid. The caliper brake apparatus 100 applies a brake to rotation of a vehicle wheel 1 by causing a brake shoe 30 to slide against a disc 1A of the vehicle wheel 1 such that frictional force is applied to the disc 1A.

The caliper brake apparatus 100 includes a caliper main body 10 and a support frame 20 that supports the caliper main body 10 and is fixed to a truck (a vehicle body), not shown in the figures. The caliper brake apparatus 100 also includes brake shoes 30 that are provided on the caliper main body 10 in a pair so as to oppose the vehicle wheel 1 from either side, and are capable of sliding against the disc 1A of the vehicle wheel 1 so as to apply frictional force thereto, a guide plate 41 that supports one brake shoe 30, an anchor pin 51 that is provided in the caliper main body 10 to be free to advance and retreat, and that supports the guide plate 41, and a pressing mechanism 60 that presses the brake shoe 30 toward the disc 1A using air pressure.

The disc 1A against which the brake shoe 30 slides is formed on both outside and inside end surfaces of the vehicle wheel 1. The discs 1A are brake discs that rotate integrally with the vehicle wheel 1. It should be noted that in the caliper brake apparatus 100, the discs 1A are formed integrally with the vehicle wheel 1, but the discs 1A may be attached to the vehicle wheel 1 as separate members.

As shown in FIG. 1, the caliper main body 10 includes a first caliper arm 11 and a second caliper arm 12 extending so as to straddle the vehicle wheel 1, a caliper yoke 13 that connects the caliper arms 11, 12, and brackets 14 that extend from the caliper yoke 13 to an opposite side to the vehicle wheel 1 side. The caliper main body 10 is attached to the support frame 20 via the brackets 14.

Figure 2:
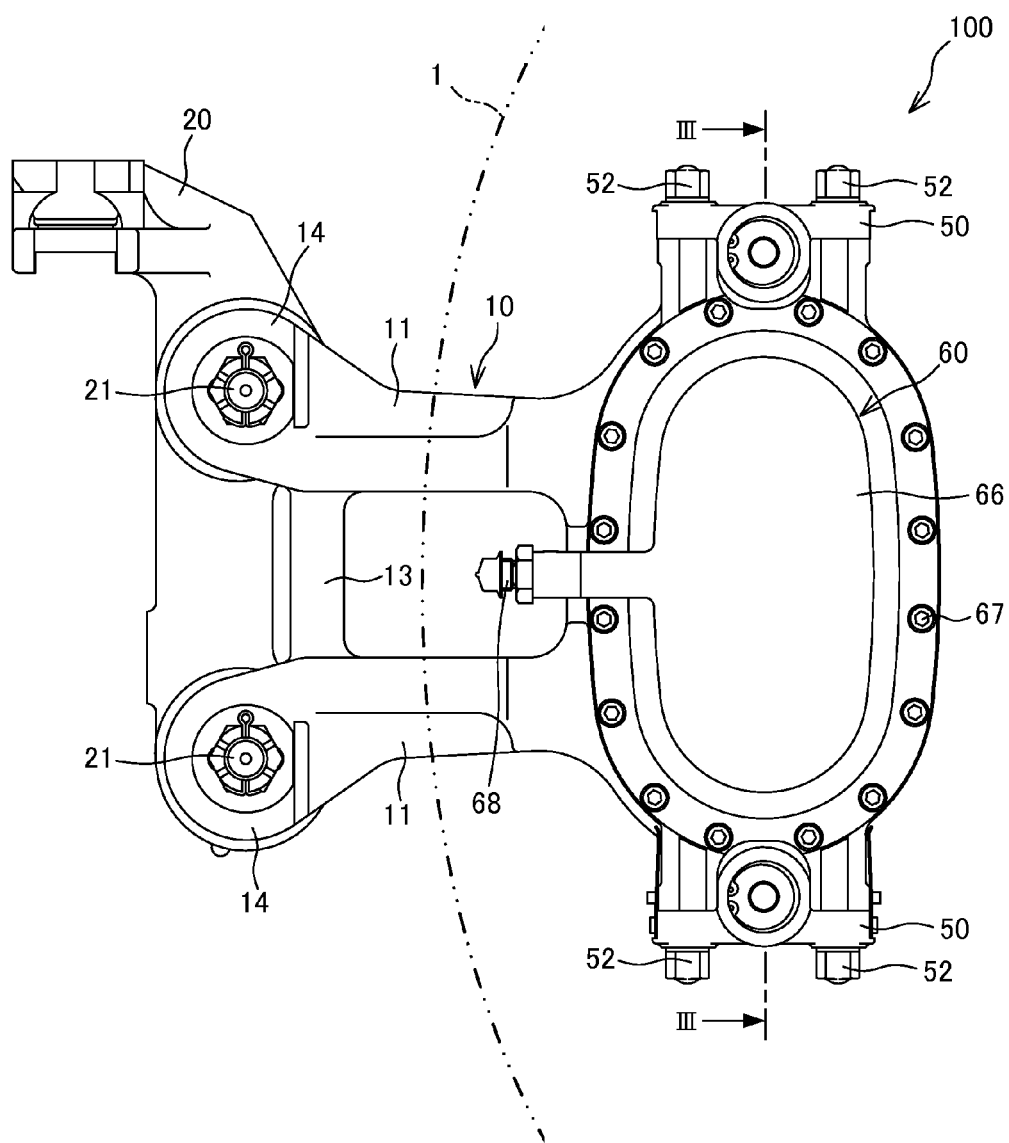
FIG. 2 is a front view of the caliper brake apparatus according to this embodiment.

As shown in FIGS. 1 and 2, the brackets 14 of the caliper main body 10 are formed to oppose the support frame 20 from either side, and the brackets 14 and the support frame 20 are connected via an upper/lower pair of slide pins 21.

The slide pins 21 are provided to penetrate the support frame 20 and the brackets 14 of the caliper main body 10. Respective end portions of the slide pins 21 are connected to the brackets 14 of the caliper main body 10. The caliper main body 10 is supported (floatingly supported) on the support frame 20 to be capable of moving in an axial direction of the slide pins 21 via the slide pins 21.

Exposed parts of the slide pins 21 positioned between the support frame 20 and the respective brackets 14 are covered by rubber dust boots 22 and thereby protected from dust, dirt, and so on.

The brake shoes 30 are provided on respective tip ends of the first caliper arm 11 and the second caliper arm 12 of the caliper main body 10 so as to oppose the respective discs 1A of the vehicle wheel 1. The brake shoes 30 respectively include linings 31 that slide against the discs 1A of the vehicle wheel 1.

The brake shoe 30 on the first caliper arm 11 side is pressed via the pressing mechanism 60 so as to slide against the disc 1A of the vehicle wheel 1. The brake shoe 30 is configured such that a back surface thereof on an opposite side to a surface provided with the lining 31 is fixed to the guide plate 41. An engagement groove 41A capable of engaging with an engagement plate (see FIG. 1) provided on the back surface of the brake shoe 30 is formed in the guide plate 41 so as to extend in a lengthwise direction. The guide plate 41 is supported on the caliper main body 10 by the anchor pin 51, to be described below (see FIG. 3).

In the caliper brake apparatus 100 described above, when the first caliper arm 11 side brake shoe 30 is pressed by the pressing mechanism 60 so as to slide against one of the discs 1A of the vehicle wheel 1, the caliper main body 10 moves relative to the support frame 20 in the axial direction of the slide pin 21 such that the second caliper arm 12 side brake shoe 30 slides against the other disc 1A of the vehicle wheel 1. A brake is applied to the rotation of the vehicle wheel 1 by frictional force generated when the linings 31 of the two brake shoes 30 slide against the respective discs 1A.

Figure 3:
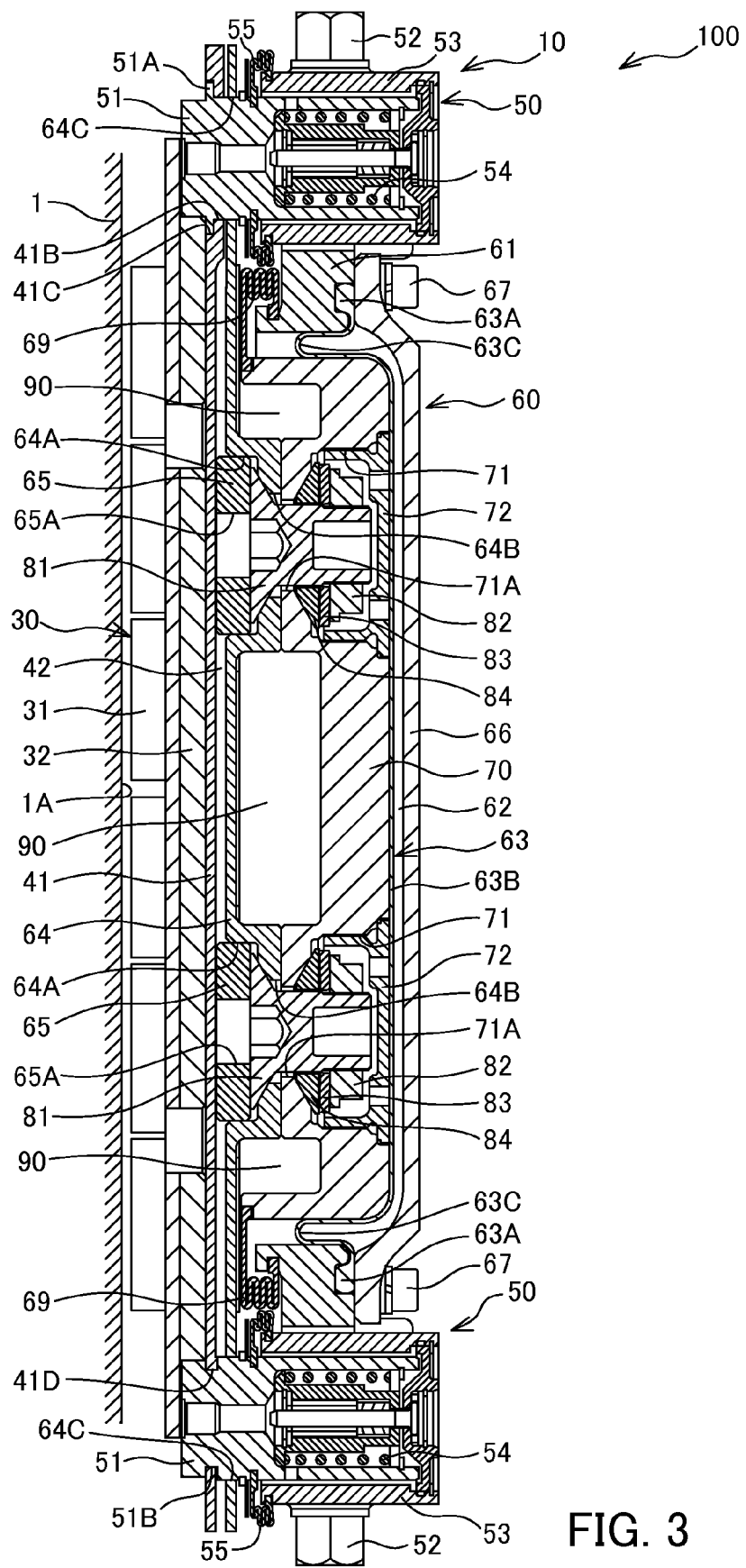
FIG. 3 is a sectional view of the caliper brake apparatus, taken along a III-III plane in FIG. 2.

Next, referring to FIG. 3, an internal structure of the first caliper arm 11 of the caliper main body 10 will be described.

An upper/lower pair of adjusters 50 and the pressing mechanism 60, which is positioned between the adjusters 50, are provided in a tip end part of the first caliper arm 11 of the caliper main body 10.

The adjusters 50 adjust an initial position of the brake shoe 30 relative to the disc 1A of the vehicle wheel 1. The adjusters 50 are attached respectively to an upper end portion and a lower end portion of the first caliper arm 11 by anchor bolts 52.

Each adjuster 50 includes a pin bearing portion 53 fixed to the caliper main body 10 by the anchor bolt 52, the anchor pin 51, which is provided to be capable of advancing and retreating relative to the pin bearing portion 53 and supports the brake shoe 30 relative to the caliper main body 10, and a return spring 54 that biases the anchor pin 51 in an advancing direction into the pin bearing portion 53.

The anchor pin 51 is formed as a closed-end cylindrical member, and provided to be free to advance and retreat into and from the pin bearing portion 53.

The anchor pin 51 positioned in the upper end portion of the first caliper arm 11 includes a collar portion 51A that projects in a radial direction from an outer peripheral surface thereof. An insertion hole 41B into which the anchor pin 51 is inserted is formed in an upper end part of the guide plate 41, and a fitting groove 41C that is fitted to the collar portion 51A of the anchor pin 51 is formed on a periphery of the insertion hole 41B. When the collar portion 51A is fitted into the fitting groove 41C of the guide plate 41, the guide plate 41 is supported by the upper end side anchor pin 51.

The anchor pin 51 positioned in the lower end portion of the first caliper arm 11 includes an annular groove portion 51B formed as a recess in an outer peripheral surface thereof. A U-shaped cutout portion 41D into which the anchor pin 51 is inserted is formed in a lower end part of the guide plate 41, and a part of the cutout portion 41D engages with the annular groove portion 51B of the anchor pin 51. When the cutout portion 41D of the guide plate 41 engages with the annular groove portion 51B, the guide plate 41 is supported by the lower end side anchor pin 51.

When the brake shoe 30 approaches the disc 1A, the upper/lower pair of anchor pins 51 are pulled out by the guide plate 41, which displaces together with the brake shoe 30, so as to retreat from the pin bearing portions 53. The anchor pins 51 hold the brake shoe 30 against a force that attempts to move the brake shoe 30 in a circumferential direction during a braking operation in which the brake shoe 30 slides against the disc 1A.

The return spring 54 is provided in the interior of the anchor pin 51. The return spring 54 is constituted by a coil spring, for example. The return spring 54 is a biasing member that returns the anchor pin 51 to an initial position using biasing force when a braking condition is switched to a non-braking condition.

It should be noted that the anchor pin 51 is configured such that a part thereof that is exposed to the outside during braking is covered by a rubber dust boot 55. As a result, dust, dirt, and so on are prevented from entering the pin bearing portion 53.

The pressing mechanism 60 includes a cylinder 61 formed in the first caliper arm 11 of the caliper main body 10, a piston 70 provided to be free to advance and retreat relative to the cylinder 61, a diaphragm 63 provided in contact with a back surface of the piston 70 so as to define a pressure chamber 62 within the caliper main body 10, a piston plate 64 supported by the anchor pin 51 so as to be fixed to the piston 70, and an intermediate member 65 disposed on a front surface of the piston plate 64.

The pressing mechanism 60 causes the piston 70 to advance and retreat relative to the cylinder 61 by adjusting air pressure in the pressure chamber 62 such that the diaphragm 63 is elastically deformed. During braking, the pressing mechanism 60 causes the piston 70 to retreat from the cylinder 61 such that the brake shoe 30 is pressed against the disc 1A of the vehicle wheel 1 via the piston plate 64, the intermediate member 65, and the guide plate 41.

The cylinder 61 is formed in a substantially elliptical shape, and the piston 70 is housed in the cylinder 61. A caliper cover 66 that closes a back surface side open end of the piston 70 is fixed to the cylinder 61 via a bolt 67.

The diaphragm 63 is a rubber elastic membrane, for example. The diaphragm 63 is disposed on the back surface side of the piston 70 such that an outer edge portion 63A thereof is sandwiched between an end surface of the cylinder 61 and an end surface of the caliper cover 66. The pressure chamber 62 is defined by the diaphragm 63 and the caliper cover 66. The diaphragm 63 elastically deforms in accordance with the air pressure in the pressure chamber 62, thereby causing the piston 70 to advance and retreat. The pressure chamber 62 is connected to an external air pressure supply source via a through hole 68 (see FIG. 2).

The diaphragm 63 includes the outer edge portion 63A, a contact portion 63B that contacts the back surface of the piston 70, and a turned back portion 63C formed to connect the outer edge portion 63A and the contact portion 63B.

The outer edge portion 63A of the diaphragm 63 is sandwiched between the cylinder 61 and the caliper cover 66. The outer edge portion 63A functions as a seal member such that air tightness is secured in the pressure chamber 62.

The turned back portion 63C of the diaphragm 63 is positioned in a gap between the cylinder 61 and the piston 70. The turned back portion 63C is configured to be capable of deforming between a turned back condition and an extended condition in accordance with the air pressure in the pressure chamber 62.

The contact portion 63B of the diaphragm 63 contacts the back surface of the piston 70 so as to press the piston 70 in accordance with the air pressure in the pressure chamber 62. When the air pressure in the pressure chamber 62 increases such that the diaphragm 63 expands, the piston 70 is pressed by the contact portion 63B so as to move in a retreating direction.

The piston 70 is a substantially elliptical plate member. The piston 70 is held in the cylinder 61 by the contact portion 63B and the turned back portion 63C of the diaphragm 63. A dust boot 69 is provided between the piston 70 and the cylinder 61. The dust boot 69 is constituted by a rubber bellows-shaped tubular member. One end of the dust boot 69 is fixed to a front side (vehicle wheel side) open end outer periphery of the cylinder 61, and another end of the dust boot 69 is fixed to a tip end outer periphery (a vehicle wheel side outer periphery) of the piston 70. Dust, dirt, and so on can be prevented from entering the cylinder 61 by the dust boot 69.

The piston plate 64 is attached to a front surface of the piston 70. The piston plate 64 is a plate member provided parallel to the guide plate 41. The piston plate 64 and the piston 70 are fastened to each other by screwing a bolt 81 (a plate cap bolt) disposed on the front surface side of the piston plate 64 to a nut 82 disposed on the back surface side of the piston 70.

Two first housing recessed portions 64A capable of housing the intermediate member 65 and a head portion of the bolt 81 are formed in the front surface of the piston plate 64. Further, second housing recessed portions 71 capable of housing a screw portion of the bolt 81 and the nut 82 are formed in the back surface of the piston 70 in positions opposing the respective first housing recessed portions 64A. Insertion holes 64B, 71A into which a shaft part of the bolt 81 is inserted are formed in respective bottom surfaces of the first housing recessed portion 64A and the second housing recessed portion 71.

When the head portion of the bolt 81 is disposed in a bottom part of the first housing recessed portion 64A, the screw portion of the bolt 81 projects into the second housing recessed portion 71, which constitutes an air chamber, through the insertion holes 64B, 71A. The nut 82, which is disposed in a bottom part of the second housing recessed portion 71, is screwed to the screw portion of the projecting bolt 81. A washer 83 and a plate spring 84 are sandwiched between the nut 82 and the bottom surface of the second housing recessed portion 71 to prevent the bolt 81 and the nut 82 from loosening. A cap member 72 is fitted into an open end of the second housing recessed portion 71 such that the second housing recessed portion 71 is closed by the cap member 72. The washer 83 is a tapered washer formed in a conical shape, and the plate spring 84 is a plate spring formed in a conical shape.

By screwing together the bolt 81 disposed in the first housing recessed portion 64A and the nut 82 disposed in the second housing recessed portion 71 in this manner, the piston plate 64 is fixed to the front surface side of the piston 70.

Further, an insertion hole 64C into which the upper side anchor pin 51 is inserted is formed in an upper end part of the piston plate 64, and an insertion hole 64C into which the lower side anchor pin 51 is inserted is formed in a lower end part of the piston plate 64. The piston plate 64 is supported by the anchor pins 51 to be free to slide via the insertion holes 64C. When the insertion holes 64C at the respective ends of the piston plate 64 are supported by the anchor pins 51, the position of the piston 70 within the cylinder 61 is prescribed by the piston plate 64.

The intermediate member 65 is a substantially disc-shaped adiabatic member that is sandwiched between the guide plate 41 and the piston plate 64 and formed from a material having a lower thermal conductivity than the piston 70 and the piston plate 64. The intermediate member 65 is formed from a material obtained by subjecting glass fiber to resin molding, for example.

The intermediate member 65 is disposed between the piston plate 64 and the guide plate 41 such that a part thereof is housed in the first housing recessed portion 64A. When the intermediate member 65 is disposed in the first housing recessed portion 64A, one surface thereof contacts the back surface of the guide plate 41 and another surface thereof contacts an end surface of the head portion of the bolt 81. The intermediate member 65 includes a hole portion 65A, which is formed to penetrate the intermediate member 65 in a thickness direction, in order to block heat transmission to the piston 70 and the diaphragm 63, or in other words to enhance an adiabatic effect. Accordingly, heat from the brake shoe 30 is transmitted to the piston 70 side via parts of the intermediate member 65 other than the hole portion 65A.

A depth of the first housing recessed portion 64A is set to be smaller than the thickness of the intermediate member 65 in a depth direction. Further, the intermediate member 65 is provided to project from the first housing recessed portion 64A, and therefore a gap 42 is formed between the piston plate 64 and the guide plate 41.

Since, as described above, the piston plate 64 and the guide plate 41 are joined via the intermediate member 65 alone and the gap 42 is formed between the piston plate 64 and the guide plate 41, the frictional heat generated when the brake shoe 30 slides against the disc 1A is unlikely to be transmitted to the piston 70 and the diaphragm 63.

Furthermore, the piston plate 64 and the piston 70 are configured such that an air layer 90 is formed between the piston plate 64 and the piston 70. The air layer 90 is provided in a position other than a connecting position between the piston plate 64 and the piston 70. The air layer 90 functions as an adiabatic layer, and therefore the frictional heat generated when the brake shoe 30 slides against the disc 1A is unlikely to be transmitted to the piston 70 and the diaphragm 63.

Next, referring to FIGS. 1 and 3, actions of the caliper brake apparatus 100 will be described.

When a braking operation is performed by a driver or the like as the railway vehicle travels, air is supplied to the pressure chamber 62 of the caliper brake apparatus 100 from the air pressure supply source, leading to an increase in the air pressure in the pressure chamber 62. When the air pressure is increased in this manner, the diaphragm 63 expands such that the piston 70 is pressed by the contact portion 63B of the diaphragm 63 and thereby moved to the disc 1A side of the vehicle wheel 1. When the piston 70 moves in this manner, the brake shoe 30 likewise moves to the disc 1A side of the vehicle wheel 1 via the piston plate 64, the intermediate member 65, and the guide plate 41. At this time, the anchor pins 51 supporting the guide plate 41 move so as to be pulled out from the pin bearing portion 53.

When, as a result of the movement of the piston 70, the first caliper arm 11 side brake shoe 30 slides against one of the discs 1A of the vehicle wheel 1, the caliper main body 10 moves relative to the support frame 20 in the axial direction of the slide pins 21, whereby the second caliper arm 12 side brake shoe 30 slides against the other disc 1A of the vehicle wheel 1. A brake is applied to the rotation of the vehicle wheel 1 by the frictional force generated when the linings 31 of the brake shoes 30 slide against the discs 1A.

In the caliper brake apparatus 100, the piston plate 64 and the guide plate 41 are joined via the intermediate member 65 alone, and the gap 42 is formed between the piston plate 64 and the guide plate 41. Therefore, frictional heat transmission to the piston 70 and the diaphragm 63 is suppressed.

When, on the other hand, the braking operation is canceled by the driver or the like, the air in the pressure chamber 62 is discharged through the through hole 68 such that the diaphragm 63 contracts. At this time, the anchor pins 51 are pulled back by the biasing force (restoring force) of the return springs 54 provided in the interior of the adjusters 50 so as to advance into the pin bearing portions 53. Accordingly, the piston 70 moves to its initial position prior to braking, whereby the brake shoes 30 separate from the discs 1A of the vehicle wheel 1. As a result, the vehicle wheel 1 can rotate without being affected by the caliper brake apparatus 100.

With the caliper brake apparatus 100 according to the embodiment described above, following effects can be obtained.

In the caliper brake apparatus 100, the guide plate 41 that supports the brake shoe 30 and the piston plate 64 fixed to the piston 70 are joined via the intermediate member 65. By interposing the intermediate member 65 in this manner, the gap 42 is formed between the piston plate 64 and the guide plate 41. The gap 42 reduces the likelihood of transmission to the piston 70 of the frictional heat generated by the sliding contact between the disc 1A of the vehicle wheel 1 and the brake shoe 30. As a result, transmission of the frictional heat to the diaphragm 63 disposed on the back surface of the piston 70 can be suppressed. By suppressing transmission of the frictional heat to the diaphragm 63, heat deterioration of the diaphragm 63 can be prevented even when the braking force generated by the brake shoe 30 is increased beyond a conventional braking force.

The intermediate member 65 is constituted by an adiabatic member, and therefore transmission of the frictional heat to the diaphragm 63 can be further suppressed.

The first housing recessed portion 64A capable of housing the intermediate member 65 is formed in the piston plate 64, and therefore the intermediate member 65 can be disposed between the piston plate 64 and the guide plate 41 easily.

The depth of the first housing recessed portion 64A is set to be smaller than the thickness of the intermediate member 65 in the depth direction, and the intermediate member 65 is provided to project from the first housing recessed portion 64A. As a result, the gap 42 can be formed reliably between the piston plate 64 and the guide plate 41.

The intermediate member 65 includes the hole portion 65A formed to penetrate in the thickness direction, and therefore the adiabatic performance of the intermediate member 65 can be improved. The heat from the brake shoe 30 is transmitted to the piston 70 side via the parts of the intermediate member 65 other than the hole portion 65A, and therefore transmission of the frictional heat to the diaphragm 63 can be even further suppressed.

The piston plate 64 is attached to the front surface of the piston 70 via the bolt 81 disposed in the bottom portion of the first housing recessed portion 64A of the piston plate 64 and the nut 82 disposed in the bottom portion of the second housing recessed portion 71 of the piston 70. A part of the frictional heat is transmitted to the diaphragm 63 via the intermediate member 65, the bolt 81, the nut 82, and the piston 70. However, the screw portion of the bolt 81 and the nut 82 are housed in the second housing recessed portion 71, and therefore heat transmitted from the bolt 81 to the nut 82 is not transmitted directly to the diaphragm 63. Hence, transmission of the frictional heat to the diaphragm 63 can be even further suppressed.

The plate spring 84 is sandwiched between the nut 82 and the bottom surface of the second housing recessed portion 71, and the nut 82 is screwed to the bolt 81 via the plate spring 84. When the plate spring 84 is not used, the entire end surface of the nut 82 contacts the bottom surface of the second housing recessed portion 71, but when the plate spring 84 is interposed between the nut 82 and the bottom surface of the second housing recessed portion 71, only a part of the end surface of the nut 82 contacts the plate spring 84 due to the conical shape of the plate spring 84. Accordingly, the heat transmitted from the bolt 81 to the nut 82 is unlikely to be transmitted to the piston 70, and therefore transmission of the frictional heat to the diaphragm 63 can be even further suppressed. Moreover, vehicle vibration and frictional heat are repeatedly input into the bolt 81 and the nut 82, but since external forces and the like can be absorbed by a spring action of the plate spring 84, loosening of the bolt 81 and the nut 82 can be prevented.

The second housing recessed portion 71 is formed as an air chamber, and therefore the heat transmitted to the nut 82 housed in the second housing recessed portion 71 is unlikely to be transmitted to the diaphragm 63. As a result, transmission of the frictional heat to the diaphragm 63 can be even further suppressed.

An embodiment of the present invention was described above, but the above embodiment merely illustrates one example of an application of the present invention, and the technical scope of the present invention is not limited to the specific configurations of the above embodiment.

In the caliper brake apparatus 100, the bolt 81 is disposed in the first housing recessed portion 64A of the piston plate 64, and the nut 82 is disposed in the second housing recessed portion 71 of the piston 70. The present invention is not limited thereto, however, and instead, for example, the bolt 81 may be disposed in the second housing recessed portion 71 and the nut 82 may be disposed in the first housing recessed portion 64A. In this case, loosening of the bolt 81 and the nut 82 is prevented by sandwiching the washer 83 and the plate spring 84 between the nut 82 and the bottom surface of the first housing recessed portion 64A.

Further, in the caliper brake apparatus 100, the intermediate member 65 includes the single hole portion 65A penetrating in the thickness direction, but the shape and number of the hole portion 65A are not limited thereto. Hence, the hole portion 65A may be formed in a plurality in the single intermediate member 65, and the hole portion 65A may be formed in a groove shape that does not penetrate the intermediate member 65.

Figure 4:
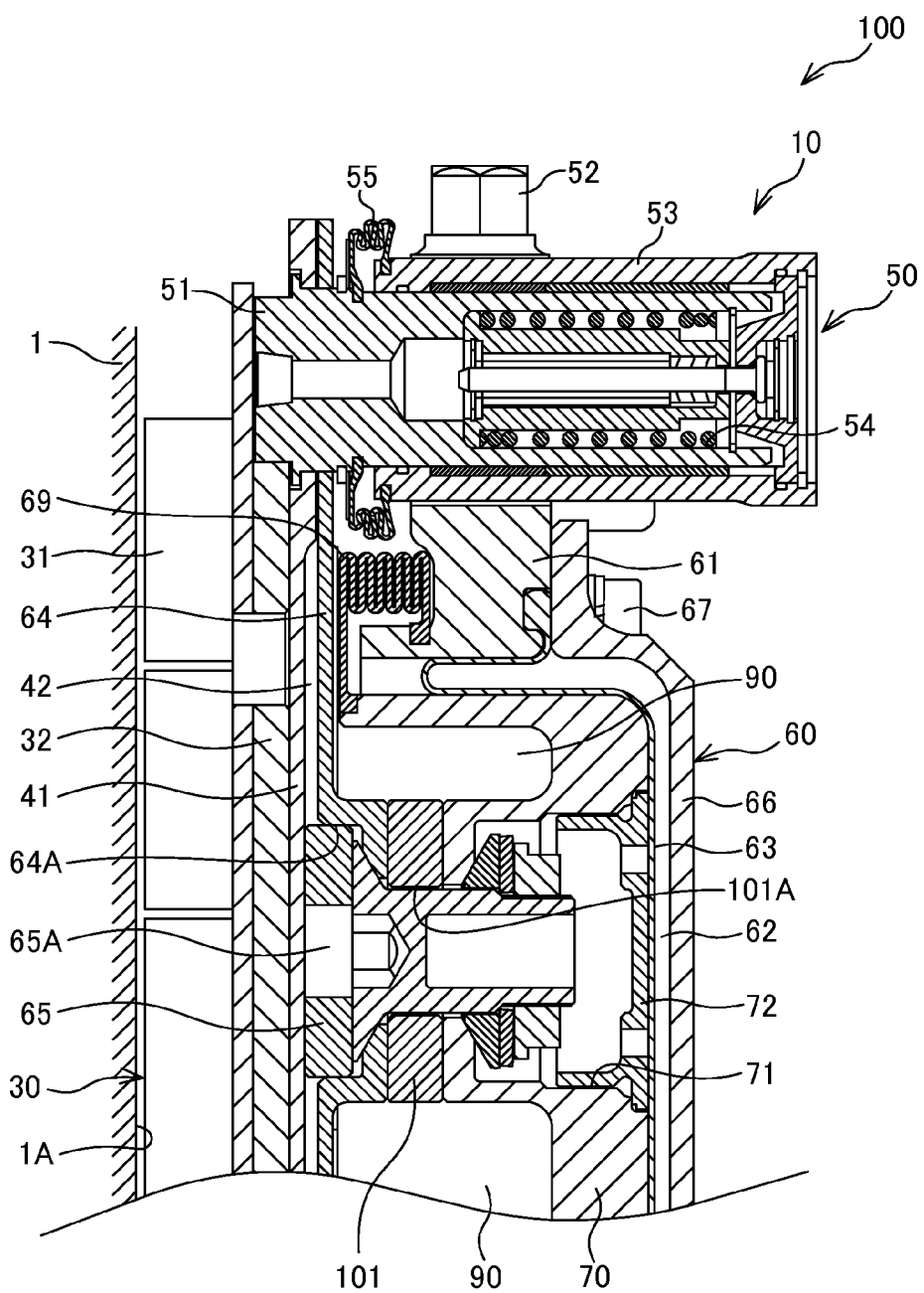
FIG. 4 is a sectional view showing a modified example of the caliper brake apparatus according to this embodiment.

Furthermore, as shown in FIG. 4, in the caliper brake apparatus 100, an adiabatic body 101 may be interposed between the piston 70 and the piston plate 64. The adiabatic body 101 is a substantially disc-shaped adiabatic member formed from a material having a lower thermal conductivity than the piston 70 and the piston plate 64. The adiabatic body 101 is formed from a material obtained by subjecting glass fiber to resin molding, for example. The adiabatic body 101 is provided in a connecting position between the piston 70 and the piston plate 64, or more specifically between a front surface of the second housing recessed portion 71 of the piston 70 and a back surface of the first housing recessed portion 64A of the piston plate 64. The adiabatic body 101 includes an insertion hole 101A into which the shaft part of the bolt 81 is inserted.

By providing the adiabatic body 101 in this manner, frictional heat is unlikely to be transmitted from the piston plate 64 to the piston 70, and therefore transmission of the frictional heat to the diaphragm 63 can be even further suppressed.

The present application claims priority based on JP2012-173814, filed with the Japan Patent Office on Aug. 6, 2012, the entire contents of which are incorporated into the present specification by reference.

The invention claimed is:

1. A caliper brake apparatus that applies a brake to a vehicle wheel by applying frictional force to a disc that rotates together with the vehicle wheel, comprising:
   a caliper main body supported by a vehicle body;
   a brake shoe capable of applying frictional force to the disc by sliding against the disc;
   a guide plate that supports the brake shoe;
   an anchor pin that supports the guide plate and is provided in the caliper main body to be free to advance and retreat relative to the caliper main body;
   a piston provided in the caliper main body to be free to advance and retreat relative to the caliper main body;
   a piston plate that is fixed to a front surface of the piston and supported by the anchor pin;
   an elastic membrane that is provided on a back surface of the piston so as to define a pressure chamber in the caliper main body, and that is configured to be deformed elastically by working fluid pressure in the pressure chamber so as to move the brake shoe via the piston, the piston plate, and the guide plate; and
   an intermediate member sandwiched between the piston plate and the guide plate,
   wherein the intermediate member is interposed between the piston plate and the guide plate such that a gap is located between the piston plate and the guide plate.

2. The caliper brake apparatus as defined in claim 1, wherein the piston plate comprises a first housing recessed portion housing a part of the intermediate member.

3. The caliper brake apparatus as defined in claim 2, wherein a depth of the first housing recessed portion is smaller than a thickness of the intermediate member in a depth direction, and
   the intermediate member projects from the first housing recessed portion, such that the gap is located between the piston plate and the guide plate.

4. The caliper brake apparatus as defined in claim 2, wherein the intermediate member is disposed such that an end surface thereof on a side not housed in the first housing recessed portion contacts the guide plate.

5. The caliper brake apparatus as defined in claim 1, wherein the intermediate member includes a hole portion extending in a thickness direction of the intermediate member.

6. The caliper brake apparatus as defined in claim 1, wherein the intermediate member is an adiabatic member having a lower thermal conductivity than the piston plate.

7. The caliper brake apparatus as defined in claim 2, wherein a second housing recessed portion is formed in the back surface of the piston in a position opposing the first housing recessed portion, and
   the piston plate and the piston are fastened to each other via a bolt disposed in a bottom portion of one of the first housing recessed portion and the second housing recessed portion, and a nut disposed in a bottom portion of the other.

8. The caliper brake apparatus as defined in claim 7, wherein the nut is screwed to the bolt via a plate spring.

9. The caliper brake apparatus as defined in claim 7, wherein the second housing recessed portion is constituted by an air chamber.

10. The caliper brake apparatus as defined in claim 1, wherein the piston and the piston plate are connected via an adiabatic body having a lower thermal conductivity than the piston plate.

11. The caliper brake apparatus as defined in claim 1, wherein an air layer is located between the piston and the piston plate.

12. The caliper brake apparatus as defined in claim 1, further comprising:
    a cylinder provided in the caliper main body to house the piston; and
    a dust boot provided between the cylinder and the piston,
    wherein the dust boot is formed from a tubular member, and
    one end of the dust boot is fixed to a tip end outer periphery of the cylinder while another end is fixed to a tip end outer periphery of the piston.

* * * * *